United States Patent [19]

Dane et al.

[11] Patent Number: 5,689,363
[45] Date of Patent: Nov. 18, 1997

[54] LONG-PULSE-WIDTH NARROW-BANDWIDTH SOLID STATE LASER

[75] Inventors: C. Brent Dane; Lloyd A. Hackel, both of Livermore, Calif.

[73] Assignee: The Regents of the University of California, Oakland, Calif.

[21] Appl. No.: 489,402

[22] Filed: Jun. 12, 1995

[51] Int. Cl.$^6$ .............................. H01S 3/10; H01S 3/098; H01S 3/08; H01S 3/23
[52] U.S. Cl. ........................ 359/334; 359/338; 359/346; 372/21; 372/93
[58] Field of Search .................. 359/334, 338, 359/346, 349; 372/21, 93

[56] References Cited

U.S. PATENT DOCUMENTS

| | | | |
|---|---|---|---|
| 4,757,268 | 7/1988 | Abrams et al. | 330/4.3 |
| 4,943,782 | 7/1990 | Stephens et al. | 359/348 |
| 5,239,408 | 8/1993 | Hackel et al. | 359/338 |
| 5,260,954 | 11/1993 | Dane et al. | 372/25 |
| 5,285,310 | 2/1994 | Miller et al. | 359/338 |

OTHER PUBLICATIONS

Dane et al, CLRO '95, May 22, 1995, vol. 455, p. 1; abst. only herewith.
Dane et al., IEEE J.Q.E., vol. 31, #1, pp. 148–163, Jan. 1995,; abst. only herewith.
Dane et al, Proc. IEEE, Int. Soc. Opt. Eng. vol. 1626, pp. 308–316, 1992; abst. only herewith.
Hackel et al, Int. J. Nonlinear Opt. Phys., vol. 2, #1, pp. 171–185, Jan. 1993; abst. only herewith.
Phillips et al, Appl. Opt., vol. 32, #36, Dec. 20, 1993, pp. 7408–7417; abst. only herewith.
Seidel et al, Appl. Opt., vol. 32, #36, pp. 7408–7417, Dec. 20, 1994; abst. only herewith.
Aniheev et al, Soc. Journ. Quant. Elect., vol. 20, #3, pp. 235–236, Mar. 1990; abst. only herewith.

*Primary Examiner*—Nelson Moskowitz
*Attorney, Agent, or Firm*—Henry P. Sartorio; John P. Wooldridge

[57] ABSTRACT

A long pulse laser system emits 500–1000 ns quasi-rectangular pulses at 527 nm with near diffraction-limited divergence and near transform-limited bandwidth. The system consists of one or more flashlamp-pumped Nd:glass zig-zag amplifiers, a very low threshold stimulated-Brillouin-scattering (SBS) phase conjugator system, and a free-running single frequency Nd:YLF master oscillator. Completely passive polarization switching provides eight amplifier gain passes. Multiple frequency output can be generated by using SBS cells having different pressures of a gaseous SBS medium or different SBS materials. This long pulse, low divergence, narrow-bandwidth, multi-frequency output laser system is ideally suited for use as an illuminator for long range speckle imaging applications. Because of its high average power and high beam quality, this system has application in any process which would benefit from a long pulse format, including material processing and medical applications.

36 Claims, 3 Drawing Sheets

LONG-PULSE-WIDTH NARROW-BANDWIDTH SOLID STATE LASER

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to solid state laser systems, and more specifically, to the efficient operation of solid state laser systems to produce long pulse-width, narrow-bandwidth outputs.

2. Description of Related Art

The efficient operation of solid state laser systems with long pulse-widths is a challenging problem. Typical Q-switched laser systems operate with pulse widths of 5–30 ns. Free running long pulse operation of a solid state laser results in a long train of pulses caused by the phenomenon of relaxation oscillation (spiking) with only a small amount of the total energy in each pulse. A number of approaches have been made to solve the long pulse problem including closed-loop variable Q-switch, open-loop variable Q-switch, saturable absorber Q-switches and the amplification of a single relaxation oscillation pulse. The first three methods typically exhibit very poor pulse to pulse stability in pulse duration, shape, and energy, and they have only been demonstrated at sub-mJ output energies. The amplification of a single relaxation oscillation pulse has been the most successful with the recent report of 1.1 J from a single laser aperture in a relatively short 100 ns pulse. The output pulse in this work maintained the approximately Gaussian shape of the input pulse; however, for most long pulse laser applications, a constant-power near-rectangular pulse-shape is desired. It is desirable to naturally produce these near-rectangular pulses with very high efficiency.

Long-pulse oscillators emitting near-rectangular pulses have been demonstrated by suppressing the relaxation-oscillation behavior (spiking) typical of solid state lasers. This has been accomplished by actively varying the intracavity loss during the laser pulse with either closed-loop feedback of the output power or with a pre-programmed temporal shape. In both cases, pulse widths of up to 600 ns were achieved. However, the sensitivity and bandwidth required for these control schemes are often difficult to achieve even in a carefully controlled laboratory environment. Long pulses have also been generated with passive control using an intracavity saturable absorber. Pulse widths of up to 500 ns have been demonstrated but with a peaked temporal profile, a large shot-to-shot pulsewidth variation (100 ns RMS), and a pulse energy of only 0.2 mJ.

The large amount of gain required for a high energy amplifier system requires that the gain medium be multi-passed for efficient extraction. However, the physical length of a 0.5–1 μs laser pulse (150–300 m) makes a multi-pass system using conventional electro-optical polarization beam switching impossible. It is desirable to design a high energy amplifier system having multi-pass capability, where the amplifier system uses a single aperture.

For applications in laser illumination and/or high average power operation, high beam-quality with low output beam divergence is critically required. No previous report of a long pulse laser system has been made that successfully incorporates wave-front correction such as that achieved with simulated-Brillouin-scattering (SBS) due to the difficulty in driving the nonlinear process above threshold during the long laser extraction pulse. It is desirable to provide a high energy amplifier system that both reduces the power threshold and produces a stable, long coherence-length output.

In illumination applications which use speckle imaging for high resolution imaging through turbulent atmosphere, at least two and up to four discrete laser frequencies with relative shifts of approximately 5 MHz must be simultaneously projected onto the target of interest. The approach of the past has been to take the output of a laser system, break it into separate beams, use either acousto or electro-optical modulation to induce the frequency shifts, and then to use a complex optical train to recombine the beams to be precisely collinear. It is desirable to provide a system which generates these frequencies inside the laser itself, where the beams are automatically assured to be exactly collinear, regardless of small alignment perturbations in the various components of the amplification beam trains.

SUMMARY OF THE INVENTION

It is an object of the present invention to provide a long-pulse-width, narrow-bandwidth solid state laser.

It is another object of the present invention to provide an amplification technique that naturally produces near-rectangular pulses with very high efficiency.

It is another object of the invention to provide a system that uses passive polarization rotation by a large aperture Faraday rotator and quartz rotators to provide eight pass amplification through a single amplifier aperture.

A further object of the invention is to incorporate a simulated-Brillouin-scattering (SBS) system, using a multi-passed Brillouin enhanced geometry, into the design of an optical amplifier to both reduce the power threshold and to produce a stable, long coherence-length output.

Another object of the invention is to take the output of a laser master oscillator system, break it into a specific number of separate beams, direct the separate beams through separate multipass amplifiers and reflect them at the mid-point in amplification from separate SBS phase conjugators where separate frequency shifts are generated for each beam in an SBS process and where the beams are automatically assured to be collinear, regardless of small alignment perturbations in the various components of the amplification beam trains.

The invention is a long pulse laser system that emits 500–1000 ns quasi-rectangular pulses at 527 nm with near diffraction-limited divergence and near transform-limited bandwidth. The system consists of one or more flashlamp-pumped Nd:glass zig-zag amplifiers, a very low threshold SBS phase conjugator system, and a free-running single frequency Nd:YLF master oscillator from which we use the exponentially rising edge of a relaxation oscillation pulse. Completely passive polarization switching provides eight amplifier gain passes. Multiple frequency output can be generated by using SBS cells having different pressures of a gaseous SBS medium or different SBS materials. This laser system produces a long pulse, low divergence, narrow-bandwidth, multiple single-frequency outputs. It is useful as an illuminator for long range speckle imaging applications. Because of its high average power and high beam quality, this system also has application in any process which would require a long pulse format, including material processing, medical applications and pumping another laser amplifier such as Ti:Al$_2$O$_3$ (Titanium sapphire).

DETAILED DESCRIPTION OF THE INVENTION

In the invention, the saturation of a leading edge of a free-running oscillator results in a quasi-rectangular output pulse. The amplitude of the output is a function of only the exponential time constant of the oscillator build-up; therefore, increasing gain in the amplifier does not increase the peak power, but extends the length of the pulse. This behavior can be recognized by reviewing the equations for the time dependence of the output power. For a system with time varying gain G(t), the output power $P_o(t)$ depends on the input power Pi(t) in the following way;

$$P_o(t) = P_i(t) e^{G(t)}.$$

Take the derivative of this equation and set $dP_o(t)/dt=0$ for constant output power and recognize that the time constant z can be defined by the relationship;

$$\tau = 1/(dG(t)/dt) - (P_o n/E_{sat} A);$$

where n is the number of amplifier passes, Esat is the saturation fluence of the gain media and A is the cross-sectional area of the amplifier and n is the number of amplifier passes. Rearranging the resulting equation and integrating both sides results in $$Pi(t) = Ce^{t/\tau}$$

where C is a constant of integration. This result clearly shows that to get a constant output pulse power requires an exponentially rising input pulse.

The oscillator is allowed to build up at a slow rate until the simulated-Brillouin-scattering (SBS) phase conjugator reaches threshold. The build up rate is then increased to the level required for the desired amplifier output level. This yields the lowest possible SBS threshold. The use of multi-passed Brillouin enhanced four wave mixing phase conjugation provides both the very low threshold SBS required for generation of long pulses as well as frequency and phase stability for Stokes return extending over many acoustic relaxation times during the long pulse.

Figure 1:
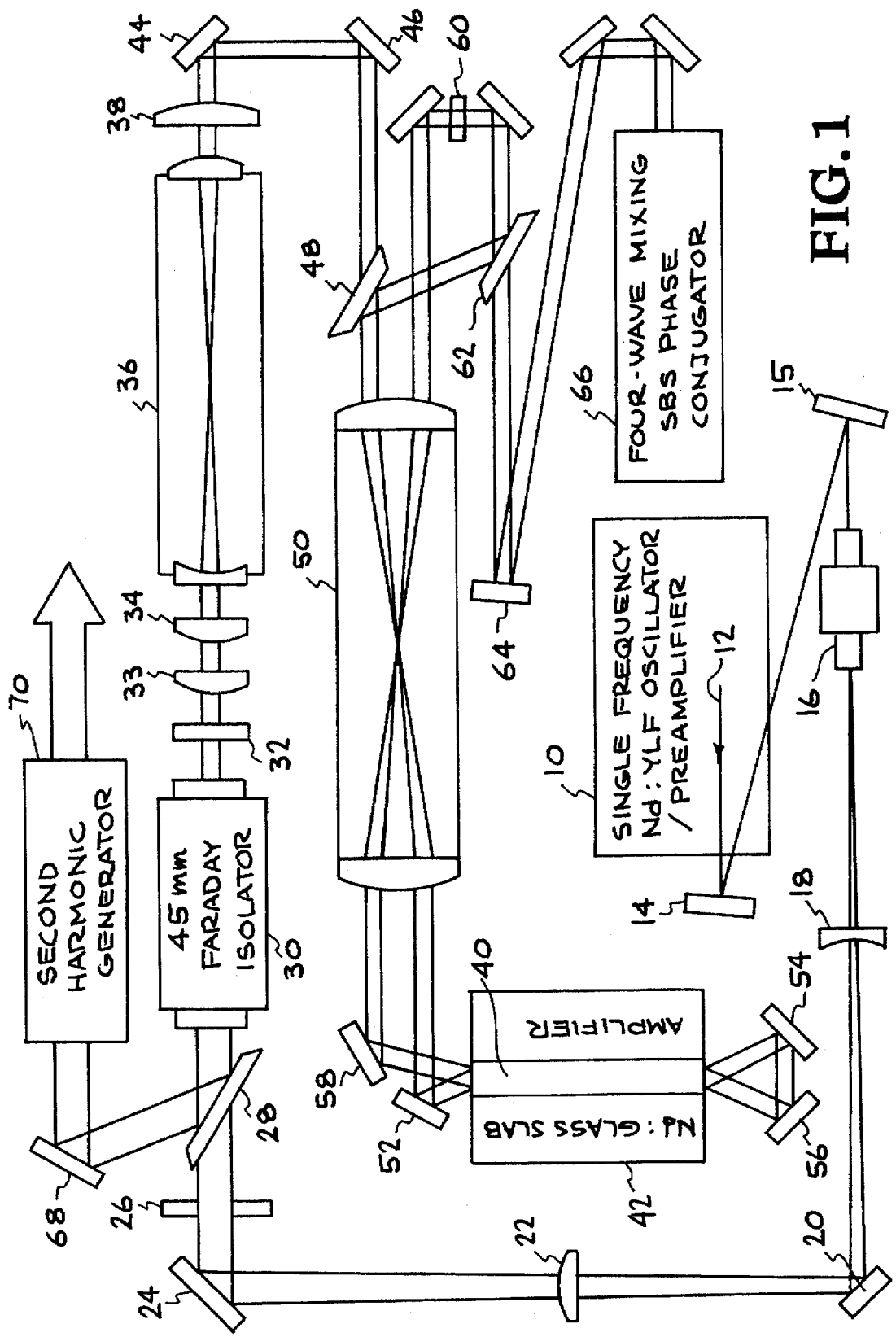
FIG. 1 shows the amplifier system having a simulated-Brillouin-scattering (SBS) phase conjugated architecture.

FIG. 1 is a schematic diagram of an embodiment of a long-pulse-width, narrow-bandwidth, solid state laser system according to the present invention. The Figure shows an oscillator/preamplifier 10 comprising, e.g., a single frequency Nd:YLF laser oscillator or preamplifier. Oscillator/preamplifier 10 produces single frequency laser beam 12. In the Nd:YLF embodiment, beam 12 has a wavelength of 1054 nm, at 240 ns FWHM and typically 60 mJ of power. Upon exiting oscillator/preamplifier 10, beam 12 is polarized horizontally, i.e., parallel to the plane of the paper of FIG. 1. Beam 12 maintains this polarization as it reflects from turning mirrors 14 and 15, passes through Faraday isolator 16 and negative lens 18, reflects from mirror 20, passes through positive collimating lens 22, reflects from mirror 24 and is masked by input mask 26. Polarizing beamsplitter 28 is oriented to transmit P-polarization, and thus, transmits horizontally polarized beam 12.

The directions of rotation of 45° Faraday isolator 30 and 45° quartz rotator 32 cancel each other in the input direction such that the beam which exits remains horizontally polarized (FIG. 1). Beam conditioning optics 33 and 34, anamorphic relay telescope 36 and collimating lens 38 prepare the beam size to fit the required aperture 40 of amplifier 42. Beam 12 reflects from mirrors 44 and 46 and transmits through polarizing beamsplitter 48 which is configured to transmit P-polarization and reflect S-polarization. The transmitter beam is relayed by 1:1 relay telescope 50 to a two-pass optical axis comprising mirrors 52, 54, 56 and 58. The amplifier 42 is place on axis with this two-pass optical axis. After passing through relay telescope 50 again, the polarization of beam 12 is rotated 90° by quartz rotator 60 to the vertical plane, i.e., perpendicular with respect to the plane of the paper. Beam 12 is then reflected by polarizing beamsplitter 62 to be re-injected into the amplification system by polarizing beamsplitter 48.

After two more amplification passes, the polarization of beam 12 (FIG. 1) is again rotated 90° allowing transmission through beamsplitter 62, reflection from mirror 64 and entrance into Four-wave mixing SBS phase conjugator 66, which reverses the phase of beam 12. Upon reversal of direction, horizontally polarized beam 12 undergoes 4 more amplification passes and propagating through polarizing beamsplitter 48, collimating lens 38, anamorphic relay telescope 36, conditioning optics 33, 34, and Faraday isolator 30, beam 12 exits the system at polarizing beamsplitter 28, which is configured to reflect S-polarization. Mirror 68 directs beam 12 through second harmonic generator 70. If the preamplifier 10 produces a pulse at 60 mJ, 240 ns FWHM and 105.4 µm, the output from second harmonic generator will be a pulse of about 16 J, at greater than 500 ns and 527 nm wavelength.

The 45 degree Faraday and quartz rotator set result in a totally passively switched beam train. The beam enters the amplifier system from the oscillator through the anamorphic telescope which takes it from a square 25×25 mm size to the 8×120 mm required by the glass amplifier aperture. In this design, the output passes back through the same telescope, restoring the 25×25 mm square beam shape. The input beam enters the regenerative amplifier ring in p-polarization through a polarizing beamsplitter, and undergoes two gain passes. The polarization is then rotated 90 degrees by the quartz rotator and it now reflects from the same beamsplitter in s-polarization and undergoes two more gain passes. When the polarization is returned to the original p-state after the second pass through the rotator the beam is coupled out through a polarizing beamsplitter in the ring and directed into the SBS four-wave mixing conjugator. The reflected beam from the conjugator retraces the path of the input beam, resulting in four more gain passes for a total of eight. The polarization rotation of the 45 degree Faraday rotator and the 45 degree quartz rotator canceled each other in the input direction but now, in the output direction, they add resulting in a full 90 degree rotation, and the amplified beam is reflected off the first polarizing beamsplitter and enters the doubler.

Figure 2:
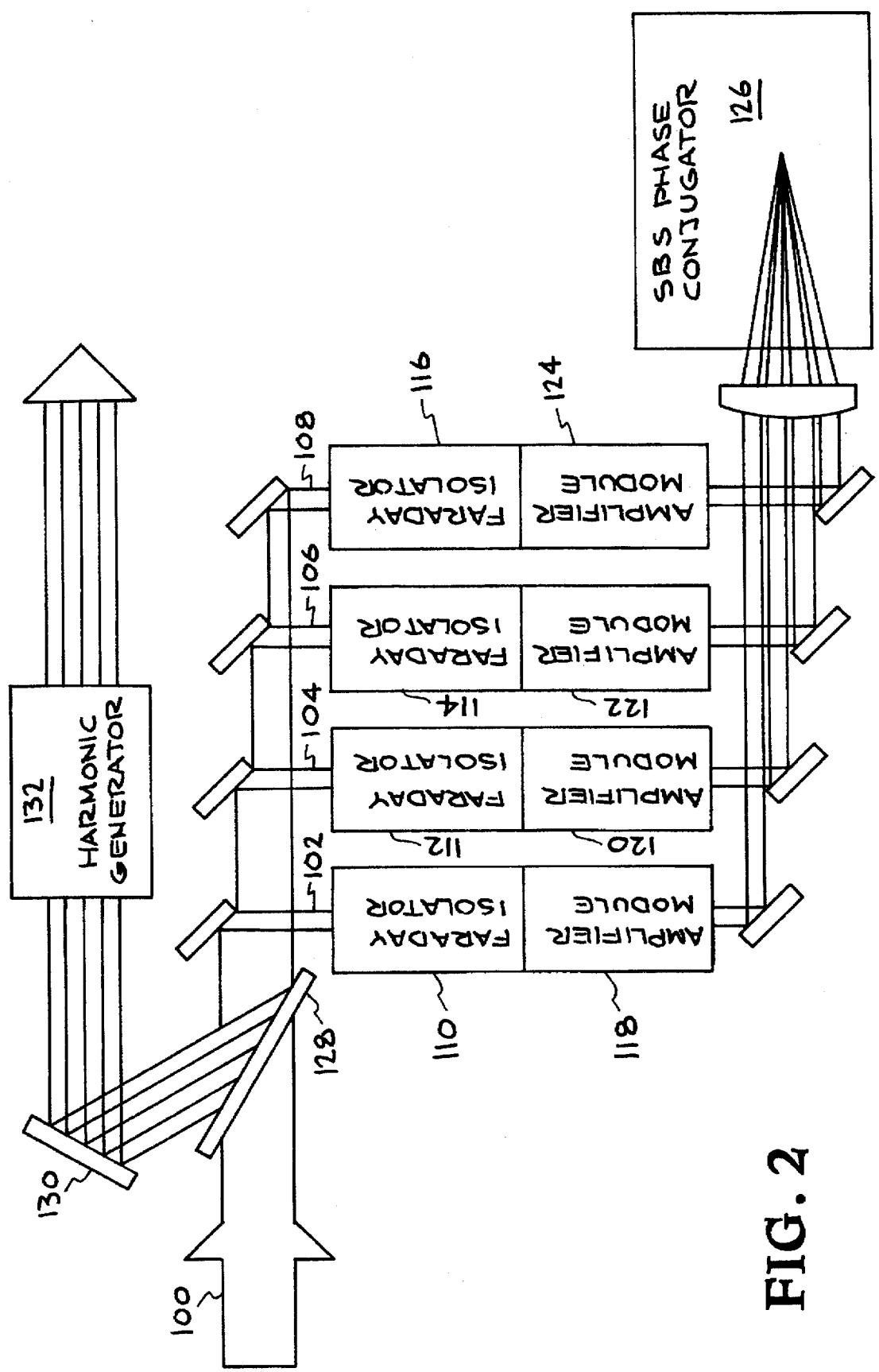
FIG. 2 shows a multifrequency amplifier system having an SBS phase conjugated structure.

FIG. 2 depicts a conceptual schematic of a multi-frequency version of the system. In this design, the oscillator input beam 100 is partitioned into 4 sub-beams 102, 104, 106 and 108, and directed through 4 separate Faraday isolators 110, 112, 114 and 116, and 4 separate amplifier modules 118, 120, 122 and 124. After four gain passes, the beams are then recombined in an SBS phase conjugator system 126. The four beams return on their respective input paths and are reflected by polarizing beamsplitter 128 to mirror 130 and through second harmonic generator 132. Using the same preamplifier specifications of the embodiment of FIG. 1 results in about 65 J at 527 nm and 600 ns.

Figure 3A:
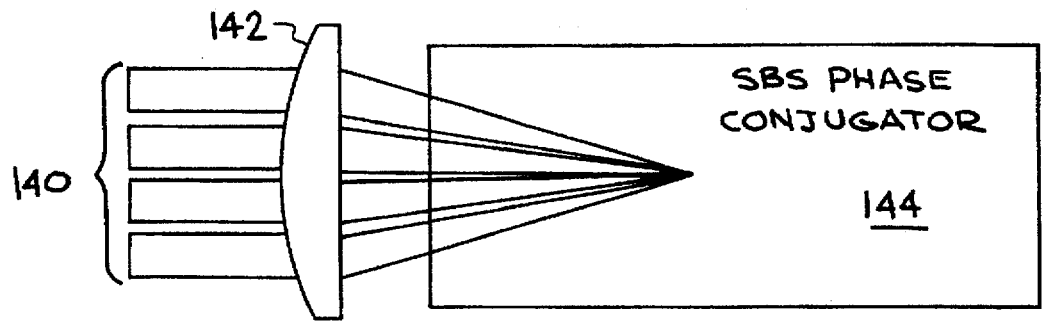
FIG. 3A shows a single beam SBS phase conjugated design.
Figure 3B:
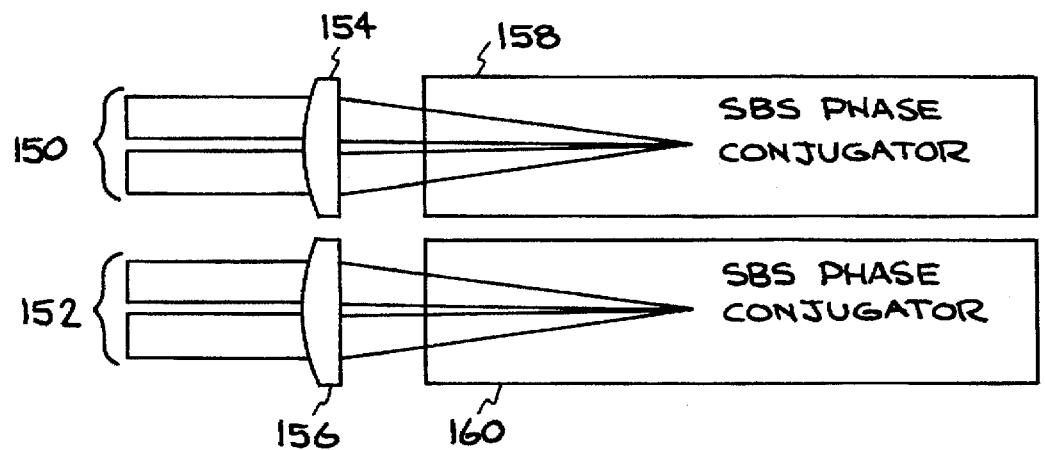
FIG. 3B shows an SBS phase conjugated design having two co-propagating beams.
Figure 3C:
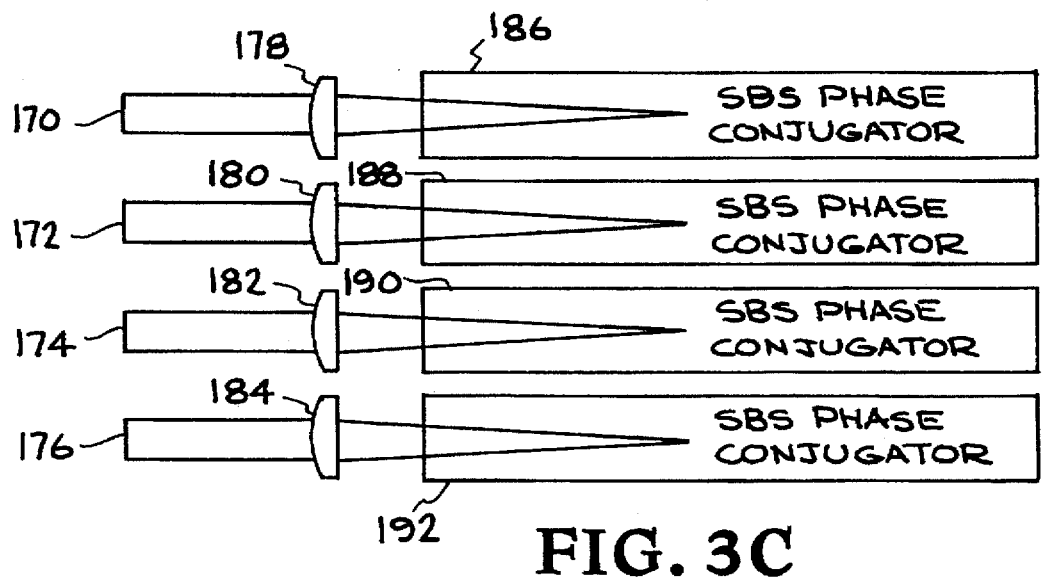
FIG. 3C shows an SBS phase conjugated design having four co-propagating beams.

FIGS. 3A–3C show schematically three of the many possible configurations for this system. In FIG. 3A, combined input beam 140 comprising four beams are focused by lens 142 into an SBS phase conjugator system 144. In FIG. 3B, combined input beam 150 and 152, each comprising two beams, are each focused by separate lenses 154, 156, into two separate SBS phase conjugator systems 158, 160. In FIG. 3C, four input beams, 170, 172, 174 and 176, are focused by lenses 178, 180, 182 and 184, into SBS phase conjugator systems, 186, 188, 190 and 192. The separate cells have either different SBS media, or the same SBS medium at different pressures, in order to vary the Stokes shift for each channel, and hence produce relative frequency shifts between two or more of the beams. In the present invention, the amplifier output can be varied from a single coherent high energy beam to multiple frequency-shifted beams. Since the multiple beams arise from a single oscillator beam, they automatically exhibit exact spatial overlap in the far field (collinearity) independent of alignment variations in the amplifier modules.

This laser amplifier extraction system allows the efficient generation of up to microsecond laser pulses by the amplification of the exponentially-rising leading edge of a free-running oscillator pulse. The output pulses are near-rectangular in shape, 600 ns in duration, and exhibit a measured coherence length of greater than 60 m. Very low threshold SBS phase conjugation using Brillouin-enhanced four-wave-mixing results in high shot-to-shot and long-term pointing stability as well as near-diffraction-limited output divergence at the full 3 Hz operating pulse-repetition-frequency (PRF).

In laser illumination applications such as long-range coherent radar or high-resolution speckle imaging, a narrow-bandwidth high energy output is required with pulse-widths in the range of 500 ns to 1 μs. These applications also benefit from the near constant output power provided by a quasi-rectangular temporal pulse-shape. The optimization of non-linear frequency conversion processes such as harmonic generation or the pumping of an optical parametric oscillator (OPO) also benefits from this pulse-shape. In addition to its use as a laser illuminator, the efficient operation of a high energy/pulse, high average power, long-pulse, solid-state laser system provides the potential for other applications in which the lower peak power improves radiation coupling and raises the optical damage threshold of materials. Examples include laser cutting and surface treatment, biological tissue treatment, as well as pumping other solid state storage lasers such as Ti:sapphire.

The energy per pulse requirements of a long range illuminator make a master-oscillator power-amplifier (MOPA) the most practical laser architecture. The design goal for the laser amplifier output that is presented here was >30 J/pulse at 1 μm. The large amount of amplification required to reach this energy from a low-energy injected oscillator pulse leads to severe temporal distortion of the input pulse-shape due to amplifier gain saturation during efficient optical extraction. For this reason, the near-rectangular output of previously reported long-pulse oscillators is not suitable as an injection source. It has been recognized, however, that the smooth temporal profile of a relaxation-oscillation pulse emitted by a free-running solid state laser suffers much less pulse-width distortion when amplified. Applying this concept, 1.1 J in a 110 ns pulse has been demonstrated from a single amplifier aperture which was then frequency-doubled to 520 mJ at 532 nm. The temporal profile remained, however near-Gaussian in shape.

This long-pulse laser scheme also relies on the amplification of the output of a free-running master oscillator. However, only the leading edge of the pulse is used. The measured width of the relaxation-oscillation spike does not determine the width of the amplified output pulse. The amplification of the leading edge of the input pulse gives rise to a quasi-constant output power, the magnitude of which is dependent only on the exponential time-constant of the rising edge. The power, and hence pulse duration, may be tailored to a desired level by adjusting the optical build-up time in the oscillator. The incorporation of very low threshold SBS phase conjugation provides near-diffraction-limited divergence and the output pulses can be frequency-doubled to 527 nm with greater than 50% total external conversion efficiency. This results in a laser system with 600 ns full-width-half maximum (FWHM) output pulse duration with a near-rectangular temporal profile, 16 J/pulse at 527 nm, and a maximum pulse-repetition-frequency (PRF) of 3 Hz. The output pulses have a measured coherence length of greater than 60 m. These demonstrated performance specifications exceed previously reported long-pulse green laser output by 5 times in duration, 30 times in pulse energy, and 18 times in average power from a single amplifier aperture. This is also the first demonstration of narrow-bandwidth SBS phase conjugation in a long-pulse, long-coherence-length laser amplifier system. Using the same laser system, pulses of almost 1 μs in duration were also amplified with equal output energy at 1053 nm. These were not doubled, however, since the design point of the second harmonic converter was for 600 ns pulses.

Changes and modifications in the specifically described embodiments can be carried out without departing from the scope of the invention, which is intended to be limited by the scope of the appended claims.

We claim:

1. An apparatus for producing a long-pulse-width, narrow-bandwidth, near diffraction limited quality output beam, comprising:

means for producing a polarized low power laser beam with an exponentially rising leading edge having a time constant τ determined from the formula $$\tau=1/(dG(t)/dt)-(P_o n/E_{sat} A);$$

at least one optical amplifier;

means for providing multiple amplification passes of said polarized low power laser beam, said multiple amplification passes propagating through said at least one optical amplifier to produce at least one amplified beam with nearly constant output power determined by said time constant of said exponentially rising leading edge of said polarized low power laser beam;

means for reversing the phase of said polarized low power laser beam and its propagation direction after half of said multiple amplification passes through said at least one optical amplifier, said reversing means including stimulated-Brillouin-scattering (SBS), wherein said amplified beam retraces its path and relative polarization through said at least one optical amplifier; and means for converting said at least one amplified beam into at least one output beam by passively switching the polarization of said at least one amplified beam.

2. The apparatus of claim 1, wherein said means for producing a polarized low power laser beam with an exponentially rising leading edge comprise a laser master oscillator activated by a pulsed source and operated in a free running output mode.

3. The apparatus of claim 2, wherein said laser master oscillator comprises a transmissive Pockels cell, wherein the rate of rise of said exponentially rising leading edge is modified by means of electronically changing the amount of polarization rotation generated by said transmissive Pockels cell within said laser master oscillator to produce first a slowly rising leading edge to allow the SBS process to reach threshold, wherein then said Pockels cell is deactivated to achieve a faster rising edge to achieve a desired output power.

4. The apparatus of claim 1, wherein said means for providing multiple amplification passes of said polarized low power laser beam include means for providing 8 amplification passes through said at least one optical amplifier to produce at least one amplified beam with nearly constant output power, wherein said means for reversing the phase of said polarized low power laser beam and its propagation direction comprise a phase conjugator.

5. The apparatus of claim 1, wherein said means for reversing the phase of said polarized low power laser beam and its propagation direction comprise a phase conjugator configured in a ring geometry with at least three focal spots, wherein said phase conjugator is placed at the physical mid-point of said multiple amplification passes, wherein said phase conjugator is setup in a 4 wave mixing stimulated Brillouin scattering (SBS) configuration to provide the reduced SBS threshold required for long pulse operation while generating and maintaining, narrow bandwidth, high beam spatial quality and stable beam pointing of said long-pulse-width, narrow-bandwidth, near diffraction limited quality output beam.

6. The apparatus of claim 1, wherein said means for producing a polarized laser beam are selected from a group consisting of a solid state laser master oscillator and a solid state laser preamplifier, wherein said producing means are operated in the free running mode.

7. The apparatus of claim 1, wherein said means for producing a polarized laser beam are selected from a group consisting of a single frequency Nd:YLF laser oscillator and a single frequency Nd:YLF preamplifier, wherein said producing means are operated in the free running mode.

8. The apparatus of claim 6, further comprising a first Faraday isolator to prevent back reflections from entering said means for producing a polarized laser beam.

9. The apparatus of claim 8, further comprising a beam expanding telescope to expand said polarized laser beam.

10. The apparatus of claim 9, further comprising a first polarizing beamsplitter oriented to transmit P-polarization and reflect S-polarization, wherein said polarized laser beam comprises P-polarization with respect to said first polarization beamsplitter, wherein said first polarizing beamsplitter transmits said polarized laser beam to produce beam 1.

11. The apparatus of claim 10, further comprising a second Faraday isolator configured to rotate the polarization of beam 1 counterclockwise 45° with respect to its direction of propagation, to produce beam 2.

12. The apparatus of claim 11, further comprising a first quartz rotator configured to rotate the polarization of said beam 2 clockwise 45° with respect to its direction of propagation, to produce beam 3.

13. The apparatus of claim 12, wherein said second Faraday rotator comprises a 45 mm diameter aperture.

14. The apparatus of claim 9, further comprising a 25 mm×25 mm square input mask.

15. The apparatus of claim 12, further comprising an anamorphic relay telescope, wherein said beam 3 comprises a square 25 mm by 25 mm size, wherein said anamorphic telescope resizes said beam 3 to 8 mm×120 mm, wherein said apparatus further comprises a collimating lens to collimate said beam 3 after it is resized by said anamorphic relay telescope.

16. The apparatus of claim 15, wherein said means for providing 8 amplification passes of said polarized laser comprise:

a second polarization beamsplitter configured to transmit beam 3, to produce beam 4;

a plurality of optics defining a two pass optical cavity configured to receive said beam 4;

an optical amplifier placed on the axis of said two pass optical cavity;

a second quartz rotator configured to rotate the polarization of said beam 4 90° to produce beam 5;

a third polarizing beamsplitter configured to reflect beam 5 onto said second polarizing beamsplitter such that beam 5 is collinear with beam 4, wherein said second quartz rotator is configured to rotate the polarization of beam 5 90°0 to produce beam 6, wherein said third polarizing beamsplitter is configured to transmit beam 6 to produce beam 7;

a phase conjugator configured to receive and reverse the phase and direction of beam 7 to produce beam 8;

wherein beam 8 propagates in reverse the beam path defined by beam 1 through beam 7 to produce a reverse beam.

17. The apparatus of claim 16, wherein said means for converting said at least one amplified beam into at least one output beam comprise said first quartz rotator, said first Faraday isolator and said first polarizing beamsplitter, wherein said first quartz rotator and said first Faraday isolator both rotate the polarization of said reverse beam 45° clockwise for a total rotation of 90°, wherein said first polarizing beamsplitter is configured to reflect said reverse beam to produce at least one output beam.

18. The apparatus of claim 1, wherein said at least one optical amplifier comprises a flashlamp-pumped Nd:glass zig-zag slab amplifier.

19. The apparatus of claim 1, wherein said at least one optical amplifier is selected to match the gain profile of said means for producing a polarized laser beam.

20. The apparatus of claim 1, wherein said means for producing a polarized laser beam comprise a free-running single frequency Nd:YLF master oscillator.

21. The apparatus of claim 1, wherein said means for reversing the phase of said polarized laser beam and its propagation direction comprise at least one phase conjugator composed of a closed cell filled with up to 100 atmospheres of compressed gas such as $N_2$.

22. The apparatus of claim 21, wherein each phase conjugator of said at least one phase conjugator comprises a unique pressure with respect to the other said phase conjugators of said at least one phase conjugator, wherein said output beam comprises multiple frequencies.

23. The apparatus of claim 16, wherein said providing means further comprises a 1:1 relay telescope optically oriented to transmit said beam 4, said 1:1 relay telescope located between said second polarizing beamsplitter and said optical amplifier.

24. The apparatus of claim 1, further comprising a second harmonic generator optically oriented to double the frequency of said output beam.

25. The apparatus of claim 1, wherein said optical amplifier comprises an 8 mm by 120 mm aperture.

26. The apparatus of claim 1, wherein said providing means comprise:

4 mirrors to separate said polarized laser beam into four polarized laser beams;
   4 Faraday isolators, each isolator of said 4 Faraday isolators optically positioned to transmit a different beam of said four polarized laser beams, wherein an optical amplifier of said at least one optical amplifier is optically positioned to transmit a different beam after it passes through an isolator of said 4 Faraday isolators;
   wherein said phase reversing means comprise at least one phase conjugator optically aligned to reverse the phase and direction of said four polarized laser beams, said phase reversing means restoring a uniform output phase to all four said amplified output beams.

27. The apparatus of claim 26, wherein said at least one phase conjugator comprises at least one four wave mixing stimulated-Brillouin-scattering phase conjugator.

28. The apparatus of claim 26, wherein said reversing means comprise a different stimulated-Brillouin-scattering media in each phase conjugator of said at least one phase conjugator.

29. The apparatus of claim 26, wherein said reversing means comprise a different pressure in each phase conjugator of said at least one phase conjugator.

30. The apparatus of claim 1, further comprising a second harmonic generator optically positioned to double the frequency of said output beam.

31. An apparatus for producing a long-pulse, near diffraction limited quality optical output beam comprised of individual physical portions of said beam each operating at a separate, stable, narrow-bandwidth frequency but exactly co-linearly propagating, said apparatus comprising:

a laser master oscillator activated by a pulsed source and operated in a free running output mode to produce a polarized output laser beam pulse with an exponentially rising leading edge having a time constant $\tau$ determined from the formula:

$$\tau = 1/(dG(t)/dt) - (P_o n/E_{sat} A);$$

at least one optical amplifier or a multiplicity thereof;
   means for providing up to 8 amplification passes of said polarized output laser beam pulse with an exponentially rising leading edge, said amplification passes propagating through said optical amplifier to produce an output pulse with nearly constant output energy;
   a separate phase conjugator for each portion of said individual physical portions, each said separate phase conjugator placed at the physical mid-point of said amplification passes and setup up in a 4 wave mixing stimulated Brillouin scattering (SBS) configuration to generate the reduced threshold required for long pulse operation and to simultaneously generate and maintain narrow bandwidth, high beam spatial quality and stable beam pointing by means of Stokes feedback in the SBS process of said SBS configuration;
   means to direct said laser beam into and out of said optical amplifier by passively switching the polarization of said polarized output laser beam pulse and said output pulse with nearly constant output energy to cause them to appropriately reflect off or transmit through polarization dependent beam splitters.

32. An apparatus for producing a long-pulse-width narrow-bandwidth pulse, comprising:

means for producing an input laser beam comprising P-polarization with an exponentially rising leading edge having a time constant $\tau$ determined from the formula:

$$\tau = 1/(dG(t)/dt) - (P_o n/E_{sat} A);$$

a first polarizing beamsplitter configured to transmit said input laser beam comprising P-polarization;
   a first Faraday isolator configured to rotate the polarization of said input laser beam 45 degrees counter-clockwise with respect to its direction of propagation after passing through said first polarizing beamsplitter;
   a first quartz rotator configured to rotate the polarization of said input laser beam 45 degrees clockwise with respect to its direction of propagation after passing through said first Faraday isolator;
   a second polarizing beamsplitter configured to transmit said input laser beam after is passes through said first quartz rotator;
   an optical amplifier;
   a plurality of mirrors configured to provide two amplification passes through said optical amplifier;
   wherein said plurality of mirrors provide two amplification passes of said input laser beam after it passes through said second polarizing beamsplitter;
   a second quartz rotator configured to rotate the polarization of said input laser beam 90 degrees clockwise with respect to it's direction of propagation after a second pass of said input laser beam through said optical amplifier;
   a third polarizing beamsplitter configured to reflect said input laser beam after it passes through said second quartz rotator, wherein said input laser beam is directed to reflect from said second polarizing beamsplitter, after said second pass of said input laser beam through said optical amplifier, to undergo two more passes through said optical amplifier, after which said second quartz rotator rotates the polarization of said input laser beam 90 degrees and said third polarizing beamsplitter transmits said input laser beam after it passes through said second quartz rotator;
   a phase conjugator setup in a multipass, multi-focus geometry by means of a ring configuration of mirrors and reimaging optics and configured to receive said input laser beam after it passes through said third polarizing beamsplitter, wherein said input beam reverses its path, to produce an output direction laser beam, wherein said first quartz rotator is configured to rotate the polarization of said output direction laser beam 45 degrees clockwise with respect to its direction of propagation, wherein said first Faraday isolator is configured to rotate the polarization of said output direction laser beam 45 degrees clockwise with respect to its direction of propagation, wherein said first polarizing beamsplitter is configured to reflect said output direction laser beam to produce an output beam.

33. An apparatus for producing a long-pulse-width narrow-bandwidth pulse, comprising:

means for producing a polarized beam of light comprising P-polarization with an exponentially rising leading edge having a time constant $\tau$ determined from the formula:

$$\tau = 1/(dG(t)/dt) - (P_o n/E_{sat} A);$$

a first polarizing beamsplitter configured to transmit said polarized beam of light to produce beam 1;
   a first Faraday isolator configured to rotate the polarization of beam 1 45° counter-clockwise to produce beam 2;

a first quartz rotator configured to rotate the polarization of beam 2 45° clockwise to produce beam 3;

a second polarizing beamsplitter configured to transmit beam 3 to produce beam 4;

a plurality of optics defining a two pass optical cavity configured to receive said beam 4;

an optical amplifier placed on the axis of said two pass optical cavity;

a second quartz rotator configured to rotate the polarization of said beam 4 90° to produce beam 5;

a third polarizing beamsplitter configured to reflect beam 5 onto said second polarizing beamsplitter such that beam 5 is collinear with beam 4, wherein said second quartz rotator is configured to rotate the polarization of beam 5 90° to produce beam 6, wherein said third polarizing beamsplitter is configured to transmit beam 6 to produce beam 7;

a phase conjugator configured to receive and reverse the phase and direction of beam 7 to produce beam 8;

wherein beam 8 propagates in reverse the beam path defined by beam 1 through beam 7 to produce a reverse beam, wherein said first quartz rotator and said first Faraday isolator both rotate the polarization of said reverse beam 45° clockwise for a total rotation of 90°, wherein said first polarizing beamsplitter is configured to reflect said reverse beam to produce an output beam.

34. A method for producing a long-pulse-width narrow-bandwidth output beam, comprising:

producing a polarized pulse with a laser master oscillator activated by a pulsed source and operated in a free running output mode, wherein said polarized pulse comprises an exponentially rising leading edge having a time constant $\tau$ determined from the formula:

$$\tau = 1/(dG(t)/dt) \sim (P_o n/E_{sat} A);$$

passing said polarized pulse through at least one optical amplifier for a total of 8 amplification passes to produce at least one amplified beam with nearly constant output energy;

reversing, with a stimulated-Brillouin-scattering (SBS) configuration, the phase of said polarized pulse and its propagation direction after 4 passes through said at least one optical amplifier, wherein said amplified beam retraces its path and relative polarization through said at least one optical amplifier, thereby providing the reduced threshold required for long pulse operation while maintaining narrow bandwidth, high beam spatial quality and stable beam pointing by means of stokes feedback in the SBS process of said SBS configuration; and converting said at least one amplified beam into at least one output beam by passively switching the polarization of said at least one amplified beam to cause it to appropriately reflect off or transmit through polarization dependent beamsplitters.

35. A method for producing a long-pulse-width narrow-bandwidth, near diffraction limited quality, optical output beam comprising:

producing a polarized output pulse with a laser master oscillator activated by a pulsed source and operated in a free running output mode, wherein said polarized output pulse comprises an exponentially rising leading edge having a time constant $\tau$ determined from the formula:

$$\tau = 1/(dG(t)/dt) \sim (P_o n/E_{sat} A);$$

amplifying said polarized output pulse with up to 8 amplification passes through an optical amplifier to produce an output pulse with nearly constant output energy;

generating, with a phase conjugator placed at the physical mid-point of said amplification passes, the reduced threshold required for long pulse operation, wherein said phase conjugator is setup up in a 4 wave mixing stimulated Brillouin scattering (SBS) configuration while generating and maintaining narrow bandwidth, high beam spatial quality and stable beam pointing by means of Stokes feedback in the SBS process of said SBS configuration; and directing said laser beam into and out of said optical amplifier by passively switching the polarization of said output pulse to cause it to appropriately reflect off or transmit through appropriate polarization dependent beamsplitters.

36. An apparatus, comprising:

means for producing a polarized low power laser beam with an exponentially rising leading edge having a time constant $\tau$ determined from the formula $$\tau = 1/(dG(t)/dt) \sim (P_o n/E_{sat} A);$$

at least one optical amplifier;

means for providing multiple amplification passes of said polarized low power laser beam, said multiple amplification passes propagating through said at least one optical amplifier to produce at least one amplified beam with nearly constant output power determined by said time constant of said exponentially rising leading edge of said polarized low power laser beam;

means for reversing the phase of said polarized low power laser beam and it propagation direction after half of said multiple amplification passes through said at least one optical amplifier, said reversing means including stimulated-Brillouin-scattering (SBS), wherein said amplified beam retraces its path and relative polarization through said at least one optical amplifier; and means for converting said at least one amplified beam into at least one output beam by passively switching the polarization of said at least one amplified beam.

* * * * *